(12) United States Patent
Vaziri (10) Patent No.: US 8,064,059 B2
(45) Date of Patent: Nov. 22, 2011

(54) OPTICAL PULSE DURATION MEASUREMENT

(76) Inventor: Alipasha Vaziri, Alexandria, VA (US)

( * ) Notice: Subject to any disclaimer, the term of this patent is extended or adjusted under 35 U.S.C. 154(b) by 381 days.

(21) Appl. No.: 12/264,390

(22) Filed: Nov. 4, 2008

(65) Prior Publication Data

US 2010/0110440 A1    May 6, 2010

(51) Int. Cl.
*G01N 21/84* (2006.01)

(52) U.S. Cl. ........................................................ 356/432
(58) Field of Classification Search .................. 356/432, 356/441, 442, 450
See application file for complete search history.

(56) References Cited

U.S. PATENT DOCUMENTS

| | | | |
|---|---|---|---|
| 5,212,698 | A | 5/1993 | Kafka et al. |
| 5,416,327 | A | 5/1995 | Weiss et al. |
| 5,906,670 | A | 5/1999 | Dobson et al. |
| 5,965,212 | A | 10/1999 | Dobson et al. |
| 6,043,496 | A | 3/2000 | Tennant |
| 6,195,167 | B1 | 2/2001 | Reid et al. |
| 6,309,798 | B1 | 10/2001 | Reetz et al. |
| 6,585,939 | B1 | 7/2003 | Dapprich |
| 7,002,149 | B2 | 2/2006 | Shigekawa et al. |
| 7,038,781 | B2 | 5/2006 | Pang et al. |
| 7,132,787 | B2 | 11/2006 | Ozkan et al. |
| 7,303,937 | B2 | 12/2007 | Chen et al. |
| 7,324,207 | B1 | 1/2008 | Kirkpatrick et al. |
| 7,358,525 | B2 | 4/2008 | Lee |
| 2006/0170331 | A1 | 8/2006 | Bertram et al. |
| 2008/0100834 | A1* | 5/2008 | Kung et al. ............ 356/301 |

OTHER PUBLICATIONS

Yoshihiro Takagi et al., Optics Letters, "Multiple- and single-shot autocorrelator based on two-photon conductivity in semiconductors," vol. 17, No. 9, May 1992 (pp. 658-660).
Alexandre M. Streltsov et al., Optics Letters, "Femtosecond ultraviolet autocorrelation meansurements based on two-photon conductivity in fused silica," vol. 23, No. 10, May 15, 1998 (pp. 798-800).
T. Elsaesser et al., Ultrafast Phenomena XII, "Unbalanced multiphoton autocorrelation techniques for fs pulse measurements in the near ir," Proceedings of the $12^{th}$ International Conference, Charleston, SC, USA, Jul. 9-13, 2000 (5 total pages).
S. Marzenell et al., "Limitations and guidelines for measuring the spectral width of ultrashort light pulses with a scanning Fabry—Perot interferometer," Applied Physics B, vol. 71, (2000), Digital Object Identifier (DOI) 10.007/s003400000370, pp. 185-191.
Edlef Buttner et al., "Infrared multiphoton microscopy beyond 1 micron: system design and biomedical applications," SPIE-OSA, vol. 6630, pp. 66300H-1 to 66300H-8.

(Continued)

*Primary Examiner* — Tarifur Chowdhury
*Assistant Examiner* — Jonathan Hansen
(74) *Attorney, Agent, or Firm* — Fish & Richardson P.C.

(57) ABSTRACT

An apparatus includes a delay producing system that receives a parent electromagnetic pulse and outputs two spatially-overlapped children electromagnetic pulses having a relative and adjustable time delay between each other; a fluorescence producing device placed in a path of the children electromagnetic pulses; a guidance system that is in the path of the children pulses and is positioned between the delay producing system and the fluorescence producing device to guide the children pulses to the fluorescence producing device; a detector that receives fluorescence produced at the fluorescence producing device, where the fluorescence travels at least partly through the guidance system before reaching the detector; and a data system that receives the value of the time delay and the output of the detector and determines the electromagnetic pulse duration based on the value of the time delay and the output of the detector.

28 Claims, 4 Drawing Sheets

OTHER PUBLICATIONS

Tom Caughey et al., LaserFocusWorld, "Autocorrelation finds wide application," [retrieved Aug. 14, 2008]. Retrieved from the Internet: http://www.laserforcusworld.com/articles/print.html?id=177591&bP001=LFW.pennnet.com, 6 total pages.

Mary Dickinson, Multiphoton Laser Scanning Microscopy, "Using the Zeiss LSM 510 NLO," Biological Imaging Center, California Institute of Technology, Feb. 2002 (34 total pages).

"Carpe Autocorrelator for Microscopy," APE, see APE website www.ape-berlin.com (2 total pages).

K. Yamane et al., Optics Express 2762, "Experimental and theoretical demonstration of validity and limitations in fringe-resolved autocorrelation measurements for pulses of few optical cycles," vol. 12, No. 12, Jun. 14, 2004 (12 total pages).

I.D.C. Tullis et al., Proc. of SPIE, "Mapping femtosecond pulse front distortion and group velocity dispersion in multiphoton microscopy," vol. 6089, (2006) pp. 60890Y-1 to 60890Y-7.

Dazhi Sun et al., NanoTechnology, "Transparent PMMA/ZnO nanocomposite films based on colloidal ZnO quantum dots," vol. 18, No. 215606, (2007) pp. 1-6.

Christian Spielmann et al., Applied Optics, "Measurement of interferometric autocorrelations: comment," vol. 36, No. 12, Apr. 20, 1997, pp. 2523-2525.

Hongjoo Song et al., Nanotechnology, "Photoluminescent (CdSe)ZnS quantum dot-polymethylmethacrylate polymer composite thin films in the visible spectral range," vol. 18, No. 055402 (2007), pp. 1-6.

W. Rudolph et al., Applied Surface Science, "Microscopy with femtosecond laser pulses: applications in engineering, physics and biomedicine," vol. 208-209 (2003), pp. 327-332.

Jinendra K. Ranka et al., Optics Letters, "Autocorrelation measurement of 6-fs pulses based on the two-photon-induced photocurrent in a GaAsP photodiode," vol. 22, No. 17, Sep. 1, 1997, pp. 1344-1346.

Franco Quercioli et al., Optics Express 4303, "Wavefront-division lateral shearing autocorrelator for ultrafast laser microscopy," vol. 12, No. 18, Sep. 6, 2004, pp. 4303-4312.

Lin Pang et al., Optics Express 44, "PMMA quantum dots composites fabricated via use of pre-polymerization," vol. 13, No. 1, Jan. 10, 2005 (6 total pages).

Lin Pang et al., J. Vac. Sci. Technol. B, "Photosensitive quantum dot composites and their applications in optical structures," vol. 23, No. 6, Nov./Dec. 2005, pp. 2413-2418.

L. Martiradonna et al., "Fabrication of Colloidal Quantum Dot Microcavities by Imprint Lithography," ICTON 2006, Mo.D2.5, I-4244-0236-0/06@2006 IEEE, pp. 64-67.

Edson Roberto Leite et al., J. Am. Ceram. Soc., "Controlled Thickness Deposition of Ultrathin Ceramic Films by Spin Coating," vol. 89, No. 6 (2006), pp. 2016-2020.

Yun-Ju Lee et al., Mater. Res. Soc. Symp. Proc., "Incorporation of Colloidal PbSe Quantum Dots into 2-D Photonic Crystal Structures," vol. 939 © 2006, 0939-O06-08, 7 total pages.

C.R. Kagan et al., Physical Review B, "Long-range resonance transfer of electronic excitations in close-packed CdSe quantum-dot solids," vol. 54, No. 12, Sep. 15, 1996-II, pp. 8633-8643.

Young-Kyu Hong et al., Applied Physics Letters, "Controlled two-dimensional distribution of nonoparticles by spin-coating method," vol. 80, No. 5, Feb. 4, 2002, pp. 844-846.

F. Hache et al., Applied Optics, "Measurement of ultrashort pulse durations by interferometric autocorrelation: influence of various parameters," vol. 35, No. 18, Jun. 20, 1996, pp. 3230-3236.

A. Gutierrez et al., Optics Letters, "Autocorrelation measurement of femtosecond laser pulses by use of a ZnSe two-photon detector array," vol. 24, No. 16, Aug. 15, 1999, pp. 1175-1177.

Yunyong Guo et al., Chem. Mater. 2007, "Smart" Self-Assembled Quantum Dots Regulate and Stabilize Structure in Phase-Separated Polymer Blends, vol. 19, pp. 6581-6587.

Akihiro Furube et al., Journal of the Korean Physical Society, "Time-Resolution Estimation of a Femtosecond Time-Resolved SNOM Having an Apertured Cantilever Tip," vol. 47, Aug. 2005, pp. S76-S79.

Michael Muller et al., Ultrafast Lasers Technology Applications, "Nonlinear Microscopy with Ultrashort Pulse Lasers," pp. 661-697.

Winfried Denk et al., Science, "Two-Photon Laser Scanning Fluorescence Microscopy," vol. 248, Apr. 6, 1990, pp. 73-76.

Andre Chevreau et al., J. Mater. Chem., "Processing and optical properties of spin-coated polystyrene films containing CdS nanoparticles," vol. 6(10), (1996), pp. 1643-1647.

G.J. Brakenhoff et al., Journal of Microscopy, "Femtosecond pulse width control in microscopy by two-photon absorption autocorrelation," vol. 179, Pt. 3, Sep. 1995, pp. 253-260.

Peter Baum et al., PNAS, "Breaking resolution limits in ultrafast electron diffraction and microscopy," vol. 103, No. 44, Oct. 31, 2006, pp. 16105-16110.

Olympus, Research Inverted System Microscope 1X71/1X81 Manual System, "Olympus IX2 inverted microscopes combined with the new UIS2 optical system open a new world of live cell imaging," date is before our filing date, 30 total pages.

Chris Xu, "Cross-Sections of Fluorescene Molecules in Multiphoton Microscopy," in: Chapter 4, *Confocal and Two-Photon Microscopy, Foundations, Applications, and Advances*, edit by Alberto Diaspro, Copyright © 2002 by Wiley-Liss, Inc., New York, pp. 75-99.

Femtosecond laser mask repair. (Feature). [online], [retrieved on Sep. 5, 2008]. Retrieved from the Internet: http://goliath.ecnext.com/coms2/gi_0198-115907/Femtosecond-laser-mask-repair-Feature.html, 2 total pages.

Photomask Clear Defects Repair Using Ultrafast Laser Technology [online], [retrieved on Sep. 5, 2008]. Retrieved from the Internet: http://www.pixertech.com/wordpress/wp-content/microlitho-06-clear-def.pdf, pp. 1-7.

Femtosecond laser mask repair. (Feature). [online], [retrieved on Sep. 5, 2008]. Retrieved from the Internet: http://www.accessmylibrary.com/coms2/summary_0286-22616911_ITM, 2 total pages.

SAO/NASA ADS Physics Abstract Service, "Implementation and performance of a femtosecond laser mask repair system in manufacturing," [online], [retrieved on Sep. 5, 2008]. Retrieved from the Internet: http://adsabs/harvard.edu/abs/1998SPIE.3546..477H.

Nanomachining, Photomask, Photomasking Repair | RAVELLC. [online], [retrieved on Sep. 5, 2008]. Retrieved from the Internet: http://www.ravelle.com/, 2 total pages.

Method of precise laser nanomachining with UV ultrafast laser pulses. [online], [retrieved on Sep. 5, 2008]. Retrieved from the Internet: http://www.freepatentsonline.com/7057135.html, 24 total pages.

Method of precise laser nanomachining with UV ultrafast laser pulses—US Patent 7057 . . . [online], [retrieved on Sep. 5, 2008]. Retrieved from the Internet: http://www.patentstorm.us/patents/7057135/description.html, 21 total pages.

Hutchinson et al., Optics Letters, "Measurement of 248-nm, subpicosecond pulse durations by two-photon fluorescence of xenon excimers," vol. 12, No. 2, Feb. 1987, pp. 102-104.

Fiorenzo G. Omenetto et al., Applied Optics, "Method of 160-fs, 248-nm pulses by two-photon fluorescence in fused-silica crystals," vol. 36, No. 15, May 20, 1997, pp. 3421-3423.

Measurement of 248-nm, subpicosecond pulse durations by two-photon fluorescence of xenon excimers. [online], [retrieved on Sep. 22, 2008]. Retrieved from the Internet: http://osa.org/abstract.cfm?id=8836&CFID=14076496&CFTOKEN=37857260, 1 page.

"40- & 45-GHz Photodetectors (Models 1004 and 1014)" from New Focus of San Jose, CA. [online], [retrieved on Sep. 26, 2008]. Retrieved from the Internet: http://www.newfocus.com/products/?navId=3&the View=modelGroupDetail&productLineId=3&productGroupId=135&modelGroupId=1140, 1 page.

"Femtometer™ Few cycle pulse characterization," from FemtoLasers of Austria. [online], [retrieved on Sep. 26, 2008]. Retrieved from the Internet: http://p52910.typo3server.info/fileadmin/documents/FEMTOMERTER.pdf, 2 pages.

\* cited by examiner

OPTICAL PULSE DURATION MEASUREMENT

TECHNICAL FIELD

This disclosure relates to optical pulse duration measurement using an autocorrelation technique.

BACKGROUND

The durations (that is, the widths) of pulses produced from mode-locked lasers can be as short as a few femtoseconds. The response times of the fastest electronic circuits are thousands of times longer than the duration of these pulses and therefore electronic techniques are not used to directly measure pulse durations. One of the shortest events available for measurement purposes is the pulse itself and this can therefore be the basis of optical autocorrelation techniques used for ultrashort pulse measurement.

In the most common autocorrelator arrangement, an input pulse (that is, a parent pulse), passes into a Michelson interferometer, which first splits the parent pulse into two child pulses, which are substantially identical in shape, amplitude, and phase, that is, are coherent. The two child pulses then travel along separate paths in the interferometer, one path being of variable length by use of a reflecting arm with a variable position. The two child pulses exit the interferometer overlapped spatially but with a relative temporal delay equivalent to the difference in path lengths travelled by each respective identical child pulse.

A two-wave mixing process, such as second-harmonic generation, is used to obtain a mixing signal between the two child pulses. By studying how the mixing signal varies in response to changes in path length, a correlation signal, containing information about the amplitude and phase of the parent pulse can be obtained from which its duration can be determined.

SUMMARY

In some general aspects, an apparatus includes a delay producing system that receives a parent electromagnetic pulse and outputs two spatially-overlapped children electromagnetic pulses having a relative and adjustable time delay between each other; a fluorescence producing device placed in a path of the children electromagnetic pulses; a guidance system that is in the path of the children pulses and is positioned between the delay producing system and the fluorescence producing device to guide the children pulses to the fluorescence producing device; a detector that receives fluorescence produced at the fluorescence producing device while the children electromagnetic pulses impinge upon the fluorescence producing device, where the fluorescence travels at least partly through the guidance system before reaching the detector; and a data system that receives the value of the time delay and the output of the detector and determines the electromagnetic pulse duration based on the value of the time delay and the output of the detector.

Implementations can include one or more of the following features. For example, the delay producing system can include an interferometer. The time delay can vary from zero seconds to about 100 microseconds.

The data system can determine the electromagnetic pulse duration by producing and analyzing a fringe resolved autocorrelation signal. The data system can include a controller that is coupled to the guidance system for controlling properties of the children electromagnetic pulses based on the determined pulse duration.

The guidance system can be an optical system that includes one or more lenses. The one or more lenses can form a microscope objective having a focal length of less than about 2 mm.

The fluorescence producing device can include quantum dots or a fluorescent dye immobilized in a transparent material. The transparent material can be a resin, a polymer, or glass that provides a uniform distribution of the quantum dots or the fluorescent dye to create a uniform fluorescence. The fluorescence producing device can include fluorescent quantum dots immobilized in polymethyl methacrylate. The fluorescence producing device can be a solid or a liquid. The fluorescence producing device can include a fluorescent material applied to a microscope coverslip, where the microscope coverslip is configured to receive a sample to be imaged that is distinct from the fluorescent material.

The apparatus can include a control unit coupled to the guidance system for adjusting one or more parameters of components of the guidance system in response to the determined electromagnetic pulse duration.

In another general aspect, a signal communicating a measurement of a pulse duration within an electromagnetic source is generated. Spatially-overlapped children electromagnetic pulses are created from a parent electromagnetic pulse by delaying one child electromagnetic pulse relative to another child electromagnetic pulse by a varying time delay. The child electromagnetic pulses are directed toward a fluorescence producing device after the child electromagnetic pulses have traveled through a guidance system. A fluorescence signal generated by the fluorescence producing device based at least in part on the child electromagnetic pulses incident thereto after or while the child electromagnetic pulses are incident upon the fluorescence producing device and passing through at least part of the guidance system after being generated are received. The pulse duration of the electromagnetic pulses that are incident upon the fluorescence producing device is determined by analyzing the fluorescence signal relative to the variable time delay.

Implementations can include one or more of the following features. For example the pulse duration can be determined by analyzing a correlation function of the amplitude of the fluorescence signal versus the variable time delay. The pulse duration can be determined by determining the number of fringes within the full width half maximum of the correlation function. The number of fringes can be determined by counting the number of fringes. The pulse duration can be determined by estimating the pulse duration to be N×t/B, where N is the number of fringes within the full width half maximum of the correlation function, t is the duration between adjacent fringes, and B is a deconvolution factor that depends on the shape of the child pulses.

The electromagnetic pulses can be directed through the guidance system by directing the pulses through a microscope objective of the guidance system.

The fluorescence signal generated by the fluorescence producing device can pass through at least a microscope objective of the guidance system. The electromagnetic source can be an optical source and the electromagnetic pulses can be optical pulses.

The pulse duration can be the full width half maximum of the electromagnetic pulses.

In another general aspect, a signal communicating a measurement of a pulse duration of an electromagnetic source is generated. Electromagnetic pulses that are delayed relative to each other by a varying time delay are directed to a fluorescence producing device including a suspension of immobilized quantum dots after the electromagnetic pulses have traveled through a guidance system. A fluorescence signal generated by the immobilized quantum dots while the electromagnetic pulses are incident upon the immobilized quantum dots is received. The pulse duration of the electromagnetic pulses that are incident upon the immobilized quantum dots is determined by analyzing the fluorescence signal relative to the relative time delay between the electromagnetic pulses.

In another general aspect, an apparatus includes an immobilized suspension of quantum dots placed in a path of electromagnetic pulses that are delayed relative to each other by a varying time delay; a detector that receives fluorescence produced at the suspension while the electromagnetic pulses impinge upon the suspension; and a data system that receives a value related to the time delay and an output of the detector and determines the pulse duration of the electromagnetic pulses based on the value of the time delay and the output of the detector.

In a further general aspect, a system converts an imaging apparatus that images a sample attached to a substrate into a pulse duration measurement apparatus. The system includes a delay producing system that receives a parent electromagnetic pulse from a light source configured to image the sample to be imaged and that outputs two spatially-overlapped child electromagnetic pulses having a relative and adjustable time delay between each other; a fluorescence producing device including a substrate, and a test sample that includes a fluorescent material that is distinct from the sample to be imaged that is placed on the substrate; and a detector that receives fluorescence produced at the fluorescence producing device while the child electromagnetic pulses are incident upon the fluorescence producing device.

Implementations can include one or more of the following features. For example, system can include a data system that receives a value relating to the time delay and an output of the detector and determines the pulse duration of the electromagnetic pulses that are incident upon the sample to be imaged based on the value of the time delay and the output of the detector. The test sample can replace the sample to be imaged during the pulse duration measurement. The substrate can be a microscope coverslip that is configured to receive the sample to be imaged.

The system can include a guidance system between the delay producing system and the fluorescence producing device such that the child pulses travel through the guidance system on the way to the fluorescence producing device; and a control unit coupled to the guidance system for adjusting one or more parameters of components of the guidance system in response to the determined electromagnetic pulse duration.

DETAILED DESCRIPTION

Pulsed lasers are used in nonlinear bio-imaging techniques such as multi-photon fluorescence excitation microscopy (MPFM) or two-photon fluorescence excitation microscopy (2PFM), which is a type of MPFM. In 2PFM, two photons of the same or different energy are absorbed by a molecule and the fluorescence from the molecule upon relaxation is collected with a highly sensitive detector such as a photodiode, a charge coupled device (CCD), a photomultiplier tube (PMT), or a, an avalanche photodiode (APD) (for example, SPCM-AQR-14 from Perkin Elmer). Because the probability of near simultaneous absorption of two photons is low, a high flux of excitation photons is usually needed, and therefore an ultrafast (for example, femtosecond) pulsed laser is typically used. An example of a suitable pulsed light source is a Ti:sapphire laser, which can typically operate from 650-1100 nm with pulse widths of about 10-150 fs, repetition frequencies of about 70-100 MHz, and at several Watts of power (for example, 3 W).

In two-photon fluorescence microscopy, the two-photon absorption efficiency and the fluorescence signal depend on the pulse duration at the location of the molecules in the sample being imaged. Furthermore, ultrashort (that is 10-150 fs) pulses are susceptible to dispersion introduced by most optical elements such as the microscope objective, which leads to an increase in the pulse duration. Therefore, it is useful to be able to measure the duration of the pulses that impinge on the molecules and to make adjustments to the pulses to ensure that the pulses are of suitable pulse duration to perform the microscopy. Below, we describe a general set-up of a multi-photon fluorescence excitation microscope in FIG. 1, and then describe with reference to FIGS. 2 and 3 an autocorrelation system that can be used in or integrated with the microscope of FIG. 1 without requiring substantial adjustments of the microscope other than, for example, the replacement of the sample with a fluorescence producing device, or the addition of a delay producing system, if one is not already integrated into the microscope of FIG. 1. In this way, the pulse measurement can be performed rather efficiently using the existing microscope.

Figure 1:
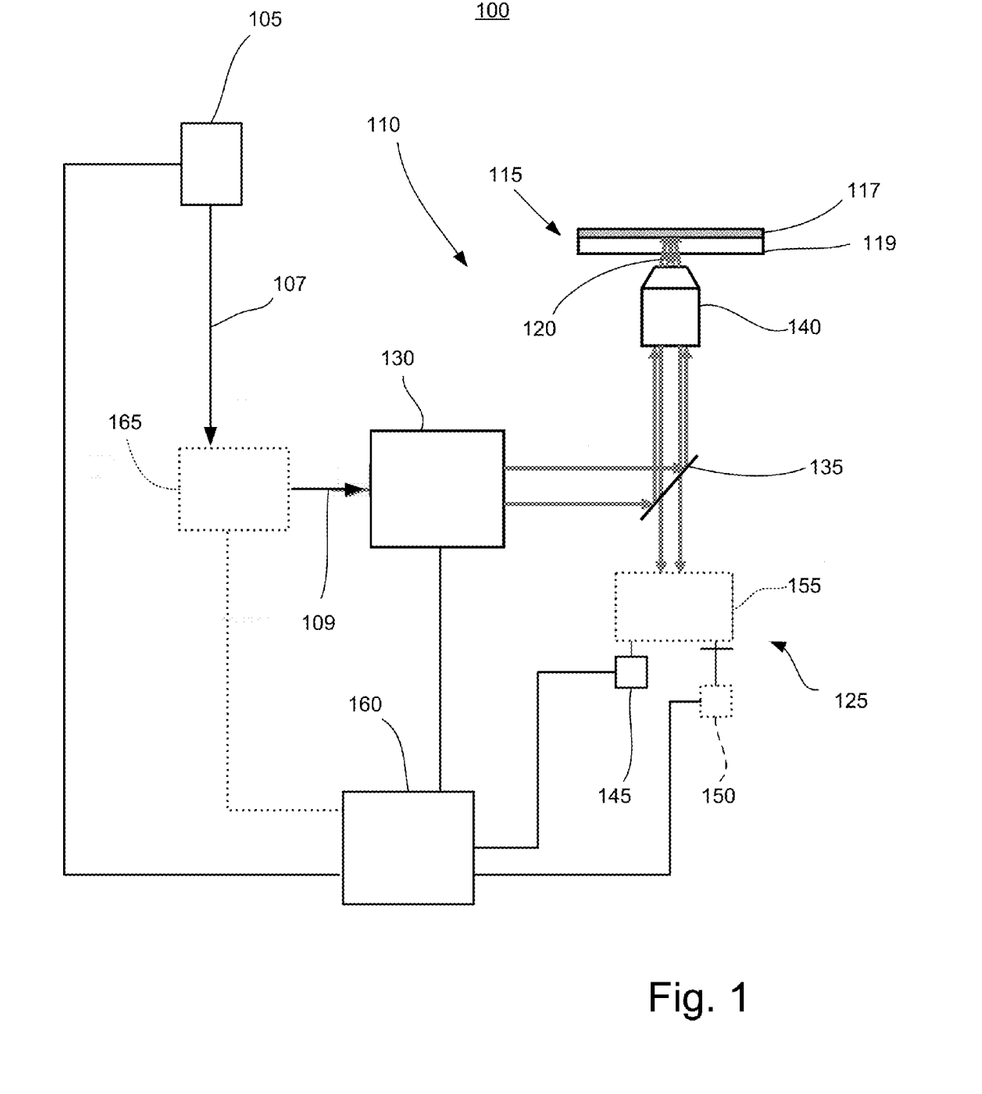
FIG. 1 is a block diagram of an imaging apparatus for multi-photon fluorescence exciation microscopy.

Referring to FIG. 1, an imaging apparatus 100 includes at least one pulsed laser source 105 that produces a pulsed laser beam 107 at an input repetition rate and an input pulse power and spectral range, an optical arrangement 110 that includes optical components for guiding and/or shaping the beam, a sample arrangement 115 including a biological sample 117 (that allows for non-linear interaction) to be imaged that is placed in the path of a beam 120 that exits the optical arrangement 110, and a detection system 125 that receives a signal of interest emitted from the sample 117. The sample 117 is usually fixed to a substrate 119 such as a microscope glass slide.

The pulsed laser source 105 produces electromagnetic radiation in the form of a train of individual pulses with defined pulse durations that can be used to view the biological sample by way of a non-linear interaction between the radiation and the biological sample. In most cases, the electromagnetic radiation is optical, that is, it is in the ultra-violet, visible, and infrared regimes of the electromagnetic spectrum and covers five decades of wavelength from the ultra-violet (0.01 µm) to the far-infrared (1 mm). The pulsed laser source 105 can be a 100 MHz Titanium Sapphire oscillator such as the Femtosource™ Synergy™ by Femtolasers™ pumped by a solid state laser such as the 10 W Verdi™ solid state green laser by Coherent, Inc. The pulses have a spectral bandwidth with a full width at half maximum of about 100 nm centered at about 790 nm and a 10 fs pulse duration. The average output power is 700 mW.

The optical arrangement 110 includes an optical system 130, a dichroic mirror 135, and a magnification objective 140 that focuses the beam to the sample 117. The objective can be a 60×, 1.2 NA water immersion objective such as UPLSAPO 60XW (http://www.olympusamerica.com/seg_section/uis2/seg_uis2_uplsapo_60xw.asp) by Olympus and the objective can be part of an IX71 inverted research microscope by Olympus that supports the sample arrangement 115. The UPLSAPO objective has a working distance of about 0.28 nm and is configured to receive a beam having an average power of about 20 mW. The working distance of an objection is the distance from a front lens element of the objective to the closest surface of the coverslip where the specimen or biological sample is in sharp focus. Information about the IX71 microscope can be found at http://www.olympusamerica.com/files/seg_research_ix71-ix81_bro.pdf, which is incorporated herein by reference in its entirety. The dichroic mirror 135 reflects the light towards the objective 140 and it can be specially designed for 2PFM. For example, the dichrosic mirror 135 can be part number FF670-SDi01-25×36 by Semrock.

The optical system 130 can include a combination of passive or active, linear or nonlinear optical components, for example, the optical system 130 can include one or more beam splitters, beam compensators, collimation devices, lenses, or mirrors. The dichroic mirror 135 reflects light at the wavelength emitted from the laser source 105 such that the light is directed to the objective 140 and to the sample 117, and the dichroic mirror 135 transmits light having wavelengths other than that of the laser source 105 such that fluorescence emitted from the sample 117 can be transmitted to the detection system 125 while preventing the light from the laser source 105 from being transmitted to the detection system 125. Fluorescence emitted from the sample 117 is electromagnetic radiation, for example, of visible or optical light, stimulated in the sample 117 by the absorption of incident electromagnetic radiation from the laser source 105 and the fluorescence persists as long as the stimulating radiation is continued or until photobleaching occurs.

The detection system 125 includes at least one detector that is able to detect a fluorescence signal emitted from the sample 117. The detection system 125 can be set up to include several different detectors such as, for example, a charge coupled device (CCD) or a photodiode 145 or a photomultiplier tube 150 as shown in FIG. 1, and one of the detectors 145, 150 can be selected with the use of a detector selector 155 depending on the operation state of the apparatus 100. For example, the detector can be a 40 or 45 GHz photodetector such as model 1004 or 1014 from New Focus (http://www.newfocus.com/products/?navId=3&theView=modelGroupDetail&productLineId=3&productGroup=135&modelGroupId=1140.) Thus, when using the imaging apparatus 100 to perform multi-photon fluorescence excitation microscopy, the photodiode 145 is selected through the selector 155 such that fluorescence emitted from the sample 117 is detected at the photodiode 145, as shown in FIG. 1. If using the IX71 microscope by Olympus, the detector selector 155 can select one of the output ports of the microscope. In this way, a user can select the output port (the detector selector 155) to select which detector would be used to analyze the fluorescence signal from the sample 117.

The imaging apparatus 100 also includes a data system 160 that can be electrically connected to one or more of the laser source 105, to one or more components of the optical system 130, and to the detectors 145, 150. Thus, the data system 160 receives the output signal from the photodiode 145 (or from the photomultiplier tube 150 if it is selected) and analyzes the signal to perform imaging of the sample 117 using any suitable technique. The data system 160 can be a computing device such as, for example, a personal computer having built in acquisition cards, a voltmeter, an oscilloscope or a monitor.

Figure 2:
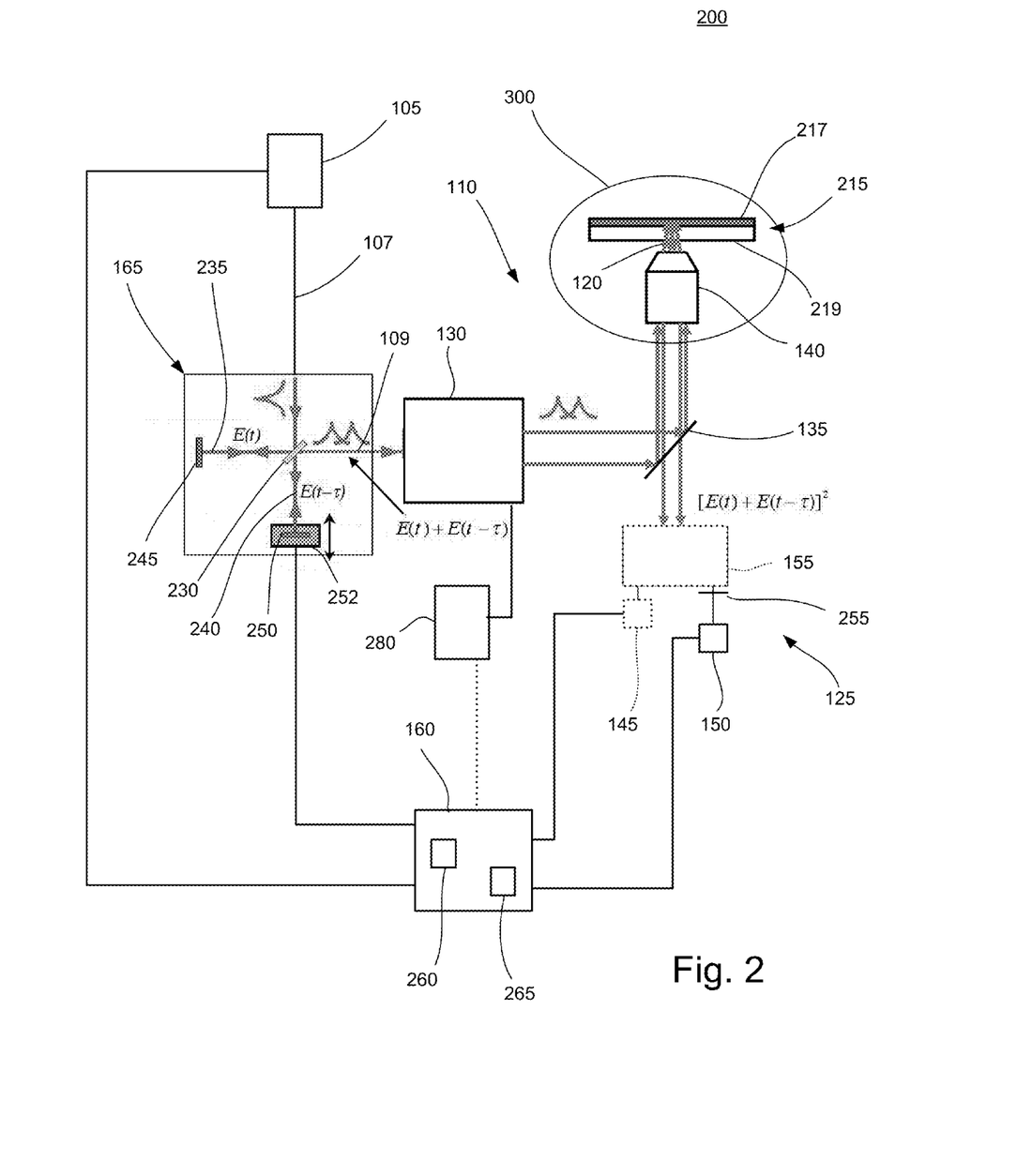
FIG. 2 is a block diagram of an imaging apparatus such as the apparatus of FIG. 1, which has been altered to include an autocorrelation system that performs an autocorrelation measurement on the pulses impinging upon samples.

Additionally, while not used in the operation shown in FIG. 1, a delay producing system 165 is positioned between the laser source 105 and the optical system 130. The delay producing system 165 is described in detail below with reference to FIG. 2. In general, the delay producing system 165, when in an active operation as shown in FIG. 2, splits pulses of the laser beam 107 into two identical pulses that are spatially overlapped and travel along a beam 109, and delays one of the pulses relative to the other pulse by a variable time delay due to the difference in path lengths between the two pulses. In the operation state shown in FIG. 1, the delay producing system 165 is either bypassed such that the laser beam 107 that exits the laser source 105 does not pass through the delay producing system 165 or the delay producing system 165 is inactive such that the laser beam 107 that exits the laser source 105 passes through the delay producing system 165, which does not produce any delay between the pulses.

Referring to FIG. 2, an imaging apparatus 200 is shown in which the imaging apparatus 100 has been reconfigured by replacing the sample arrangement 115 with a fluorescence arrangement 215 including a fluorescence producing device 217 that is fixed to a substrate 219, by selecting through the detector selector 155 the photomultiplier tube 150 (or any suitable detector coupled to the detector selector 155), and by activating the delay producing system 165. The apparatus 200 is used to measure pulse durations of the light that impinges upon the sample 117 by measuring an autocorrelation signal at the focal point of the light that is transmitted through the objective 140.

As mentioned above, the delay producing system 165 is a system that splits pulses of the laser beam 107 into two pulses that travel along a beam 109, and delays one of the pulses relative to the other pulse by a time delay that is varied over time. The delay producing system 165 is configured so that the output pulses are overlapped in space. As shown in FIG. 2, the delay producing system 165 is a scanning Michelson interferometer. The interferometer includes a beam splitter 230 that splits the parent pulse into two child pulses that pass along different paths 235, 240 and are reflected off reflectors or mirrors 245, 250. The mirrors 245, 250 are configured such that their relative distance from the splitter 230 is adjustable to cause the child pulses to travel along paths 235, 240, which can be varied in length from each other to adjust the time delay between the child pulses that are output from the interferometer. In FIG. 2, for example, one mirror 245 is fixed while the other mirror 250 is movable and is referred to as the scanning arm. The child pulses leave the interferometer along the beam 109. As the scanning arm is moved, it introduces and varies a path difference between the paths 235, 240 traveled by the two child pulses such that the pulses that exit along the beam 109 are overlapped spatially but have a relative and variable delay that is directly determined by the different in the lengths of the paths 235, 240.

In one implementation, the delay producing system 165 can be a part of a pre-fabricated system that has been reconfigured to this particular application. Thus, the delay producing system 165 can be a self-contained system taken from the Femtometer™ produced by Femtolaser™, where a photodiode, a short pass filter, a BBO crystal, and a focusing mirror are removed from the Femtometer prior to use in the apparatus 200. Information about Femtometer™ can be found at http://p52910.typo3server.info/fileadmin/documents/FEMTOMETER.pdf, which is incorporated herein by reference in its entirety.

The photomultiplier tube 150 can be Photosensor Module H6780 by Hamamatsu. Additionally, a shortpass emission filter 255 can be placed in front of the photomultiplier tube 150 to collect the fluorescent light generated by the fluorescence producing device 217. The filter 255 can be FF01-680/SP-25 by Semrock. The data system 160 can include the control unit 260 of the Femtometer, which receives the output voltage of the photomultiplier tube 150. Moreover, the data system 160 can also include a monitoring device 265 such as the software package Fmtoaqq 166i provided with the Femtometer or an oscilloscope that is independent of the Femtometer.

The fluorescence producing device 217 is any device that produces fluorescence that can be detected with accuracy by the detector (which in this example, is the photomultiplier tube 150). In particular, the fluorescence from the device 217 is emitted in all directions and therefore can be more easily collected by the objective 140 to provide enough signal to enable an autocorrelation measurement after detection by the photomultiplier tube 150. Thus, the light used to excite the device 217 travels through the objective 140, which also collects the fluorescences from the device 217. The fluorescence producing device 217 can include a fluorescent material immobilized in a transparent material. For example, the fluorescent material can be a fluorescent dye and the transparent material can be a resin, a polymer, or glass. In any case, the transparent material should be selected to provide for a uniform distribution of the fluorescent material throughout the transparent material so that the fluorescence emitted from the fluorescence producing device 217 is substantially uniform.

Figure 3:
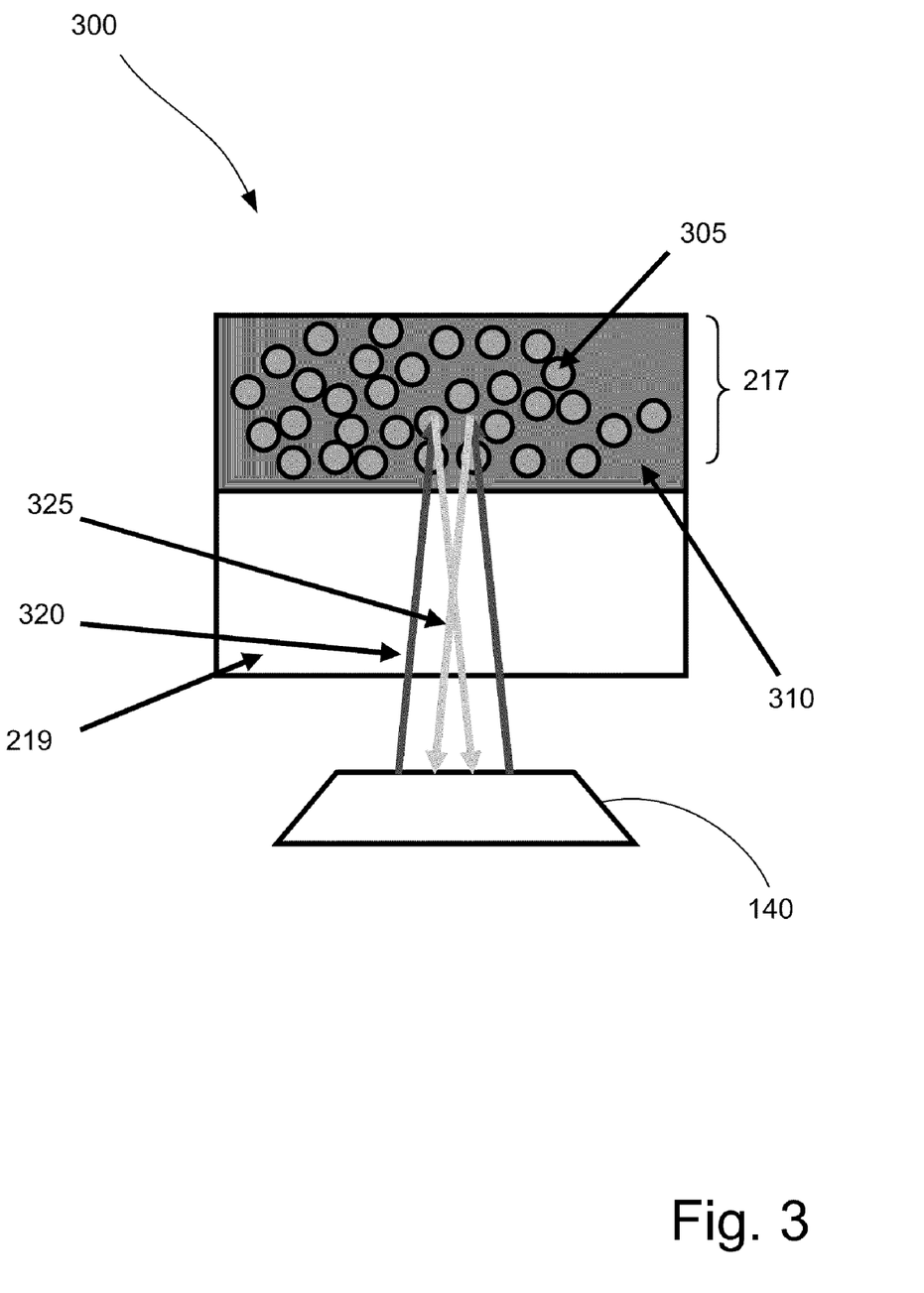
FIG. 3 is a schematic diagram of a microscope objective and a fluorescence producing device for use in the autocorrelation system of FIG. 2.

Referring to FIG. 3, in one implementation, the fluorescence producing device 217 includes as the fluorescent material fluorescent quantum dots 305, which are immobilized in polymethyl methacrylate (PMMA) 310, which serves as the transparent material. Quantum dots are semiconductor particles having typical dimensions of between one or two nanometers to tens of nanometers and having shapes such as, for example spheres, ellipsoids, discs, cubes, etc. In quantum dots, the fluorescence emission wavelength among other factors are related to the size of the quantum dots. For example, CdSe/ZnS quantum dots in toluene having an emission peak of about 520 nm can be used. Such quantum dots can be purchased from Evident Technology and an exemplary product is item ED-C11-TOL-0520, the EviDot by Evident Technology. The quantum dots 305 are diluted with toluene and PMMA to a concentration of 8 micro Molar. The PMMA can be item 495 PMMA A2, #050090719 from MicroChem of Massachusettes. Three micro liters of the mix is applied at the center of a microscope coverslip 219 (#1.5) and is spun for about two minutes at 1500 rpm using a spin processor, for example, the WS-400Lite by Laurell Technologies of Pennsylvania, until a dry uniform layer is achieved. The thickness of the device 217 is determined to be about 80 nm using a mechanical profiler such as the Dektak 150 by Veeco of Arizona.

The child pulses that exit the delay producing system 165 along the beam 109 pass through the optical system 130, are deflected by the dichroic mirror 135, and pass through the objective 140, which focuses the deflected beam 320 onto the fluorescence producing device 217. The fluorescence producing device 217 generates two photon fluorescence 325 that is emitted in all directions. At least a portion of the fluorescence 325 travels back through the objective 140, through the dichroic mirror 135, and through the selector 155 (which can be the microscope output port), where it is collected by the photomulitiplier tube 150 that is selected at the microscope output port. The photomulitiplier tube 150 receives the fluorescence while the child electromagnetic pulses impinge upon the fluorescence producing device 217; that is, fluorescence is emitted from the device 217 after the child electromagnetic pulses impinge upon the device 217 and fluorescence continues for as long as the child electromagnetic pulses impinge upon the device 217. The data system 160 receives a voltage signal output from the photomultiplier tube 150 because the signal output of the photomultiplier tube 150 is connected to the data system 160 by a cable. Additionally, the data system 160 receives a value that is related to the delay between the child pulses from a delay mechanism 252 (that can include a piezoelectric device) that controls the position of the mirror 250. For example, the delay mechanism 252 can include a signal generator that produces a signal that can have the shape of a sine curve or a hack saw curve, for example, and the amplitude and frequency of this signal can be set by the user. This signal is used to control the piezoelectric device, which is attached to the mirror 250 in the scanning arm of the delay producing system 165. The data system 160 can determine the delay based on the position of the mirror 250 in the delay producing system 165.

Figure 4:
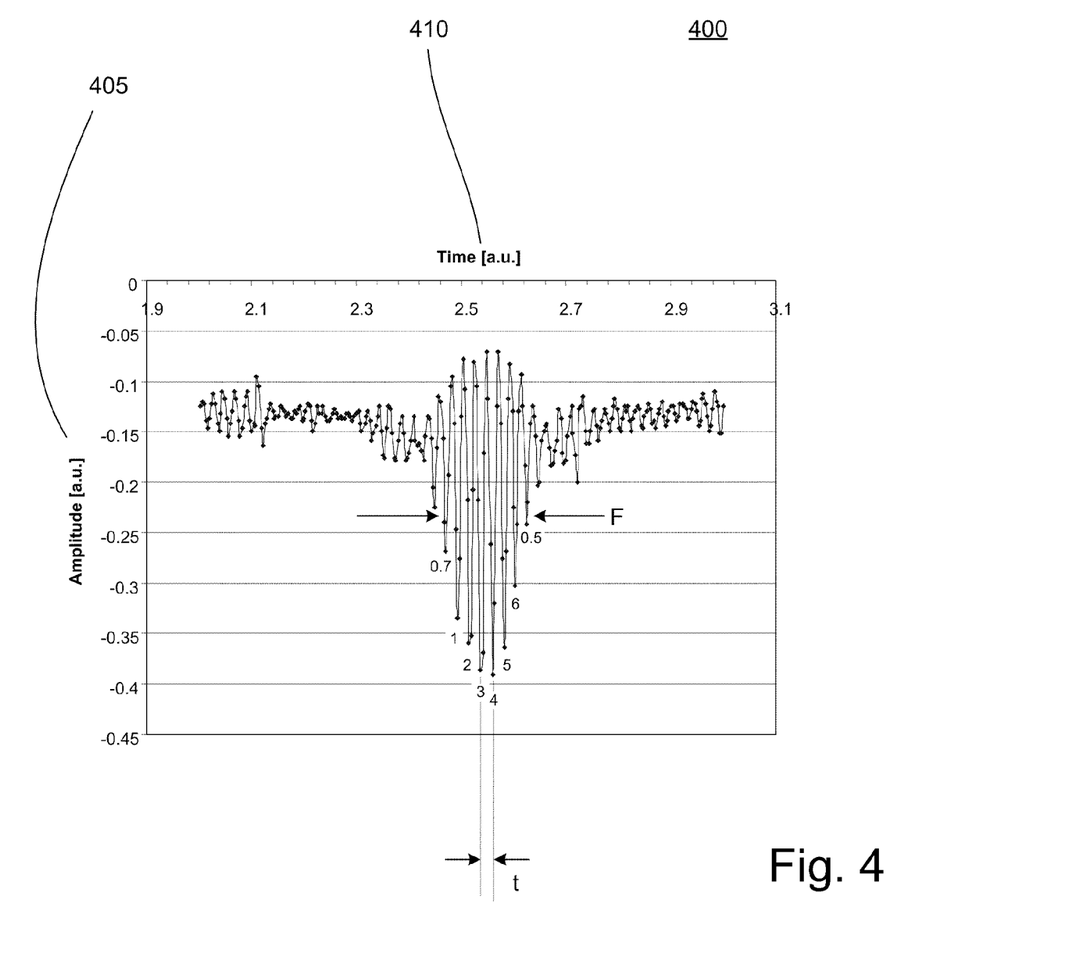
FIG. 4 is a graph of an autocorrelation signal produced by a data system of the imaging apparatus of FIG. 2.

Referring to FIG. 4, the data system 160 produces an autocorrelation function 400 of the amplitude 405 of the fluorescence signal versus the time delay 410 between the child pulses that is produced by the system 165. The amplitude of the fluorescence signal is determined from the voltage output by the photomultiplier tube 150 and the time delay is determined based on the difference in length of the paths 235, 240 the child pulses travel, which is determined by the relative position between the mirrors 245, 250 and the beam splitter 230 (for example, if the mirror 245 is fixed, then this can be determined from the position of the mirror 250). The data system 160 sends the autocorrelation function 400 to the monitoring device 265 so that it can be viewed by a user. The data system 160 calculates or estimates the pulse duration D (that is, the full width half maximum) of the child pulses that impinge upon the sample 117 and 217 using the following formula:

$$D = N^* \Delta t / B,$$

where N is the number of fringes within the full width half maximum F of the autocorrlation function 400, $\Delta t$ is the time or duration between adjacent fringes of the autocorrelation function 400, and B is a deconvolution factor that depends on the shape of the child pulses and of the setup of the delay producing system 165. The fringe spacing $\Delta t$ can be calculated as being $\lambda_0/c$, where $\lambda_0$ is the center wavelength of the beam 107 emitted from the laser source 105, and c is the speed of light. The deconvolution factor B is a predetermined value and is 1.897 if the pulse shape is assumed to be a $\mathrm{sech}^2$ shape. In one implementation in which the center wavelength $\lambda_0$ is 790 nm, $\Delta t$ is 2.63 fs. The number of fringes N is estimated by counting the number of fringes above the 50% line F and using linear interpolation to determine the percentage of the fringe-period at the 50% line F. In the example shown in FIG. 4, N=0.5+6+0.7=7.2. In this example, D=7.2*2.63 fs/1.897=10 fs.

Referring again to FIG. 2, the imaging apparatus 200 can include a control unit 280 that is connected to one or more components of the optical system 130. The user can adjust parameters of the one or more components through the control unit 280 based on the values produced by the data system 160. For example, the user can adjust a dispersion compensator within the optical system 130 to adjust the pulse width based on the pulse width determined by the data system 160. In other implementations, the data system 160 can be directly connected to the control unit 280 to provide direct feedback to the control unit 280 to provide for automatic adjustment of pulse widths. Typically, however, the user can perform the adjustment directly on components of the optical system 130 without an automatic adjustment by the control unit 280 because feedback need not occur in real time during imaging of the sample 117. In either case, the parametric adjustment can be iterative; that is, adjustment can take place with the control unit 280 after a feature measurement by the data system 160 and then another measurement can be taken by the data system 160 or can be viewed by the user, and another adjustment can take place with the control unit 280, etc., until the user determines that the pulse duration at the sample is acceptable. This iterative process could be automated by connecting the control unit 280 to the data system 160, as shown by the dotted line.

The technique described above may be configured for particular utility for objectives 140 having short working distances (for example, under 2 mm), where it might be difficult to use previous autocorrelation systems that require more space to perform the needed calculations and adjustments or that require space offsets between the objective 140 and the detectors. Additionally, the imaging apparatus 200 can be used for any immersion fluid that might be used between the objective 140 and the sample 217 because the substrate 219 is positioned between the sample 217 and the objective 140 and the immersion fluid can be used between the substrate 219 (which is impervious to the immersion fluid) and the objective 140. Moreover, the two-photon fluorescence from the sample 217 can be collected with the same objective 140 that is used during imaging of the sample 117 in an epi-fluorescence fashion and therefore the fluorescence passes through the objective 140 without requiring special alignment of the collection optics (for example, the objective 140 and the photomultiplier tube 150).

Other implementations are within the scope of the following claims. For example, the technique described herein can be applied to nano- or micro-machining using a pulsed femtosecond laser. As another example, the technique can be applied to mask repair using a pulsed femtosecond or ultrafast laser. As a further example, the technique can be applied to laser lithography using a pulsed femtosecond or ultrafast laser.

What is claimed is:

1. An apparatus comprising:
    a delay producing system that receives a parent electromagnetic pulse and outputs two spatially-overlapped children electromagnetic pulses having a relative and adjustable time delay between each other;
    a fluorescence producing device placed in a path of the children electromagnetic pulses;
    a guidance system that is in the path of the children pulses and is positioned between the delay producing system and the fluorescence producing device to guide the children pulses to the fluorescence producing device;
    a detector that receives fluorescence produced at the fluorescence producing device while the children electromagnetic pulses impinge upon the fluorescence producing device, where the fluorescence travels at least partly through the guidance system before reaching the detector; and
    a data system that receives the value of the time delay and the output of the detector and determines the electromagnetic pulse duration based on the value of the time delay and the output of the detector.

2. The apparatus of claim 1, wherein the delay producing system includes an interferometer.

3. The apparatus of claim 1, wherein the time delay varies from zero seconds to about 100 microseconds.

4. The apparatus of claim 1, wherein the data system determines the electromagnetic pulse duration by producing and analyzing a fringe resolved autocorrelation signal.

5. The apparatus of claim 1, wherein the data system includes a controller that is coupled to the guidance system for controlling properties of the children electromagnetic pulses based on the determined pulse duration.

6. The apparatus of claim 1, wherein the guidance system is an optical system that includes one or more lenses.

7. The apparatus of claim 6, wherein the one or more lenses form a microscope objective having a focal length of less than about 2 mm.

8. The apparatus of claim 1, wherein the fluorescence producing device includes quantum dots or a fluorescent dye immobilized in a transparent material.

9. The apparatus of claim 8, wherein the transparent material is a resin, a polymer, or glass that provides a uniform distribution of the quantum dots or the fluorescent dye to create a uniform fluorescence.

10. The apparatus of claim 1, wherein the fluorescence producing device includes fluorescent quantum dots immobilized in polymethyl methacrylate.

11. The apparatus of claim 1, wherein the fluorescence producing device is a solid or a liquid.

12. The apparatus of claim 1, wherein the fluorescence producing device includes a fluorescent material applied to a microscope coverslip, where the microscope coverslip is configured to receive a sample to be imaged that is distinct from the fluorescent material.

13. The apparatus of claim 1, further comprising a control unit coupled to the guidance system for adjusting one or more parameters of components of the guidance system in response to the determined electromagnetic pulse duration.

14. A method of generating a signal communicating a measurement of a pulse duration within an electromagnetic source, the method comprising:
    creating spatially-overlapped children electromagnetic pulses from a parent electromagnetic pulse including delaying one child electromagnetic pulse relative to another child electromagnetic pulse by a varying time delay;
    directing the child electromagnetic pulses toward a fluorescence producing device after the child electromagnetic pulses have traveled through a guidance system;
    receiving a fluorescence signal generated by the fluorescence producing device based at least in part on the child electromagnetic pulses incident thereto after or while the child electromagnetic pulses are incident upon the fluorescence producing device and passing through at least part of the guidance system after being generated; and
    determining the pulse duration of the electromagnetic pulses that are incident upon the fluorescence producing device by analyzing the fluorescence signal relative to the variable time delay.

15. The method of claim 14, wherein determining the pulse duration includes analyzing a correlation function of the amplitude of the fluorescence signal versus the variable time delay.

16. The method of claim 15, wherein determining the pulse duration includes determining the number of fringes within the full width half maximum of the correlation function.

17. The method of claim 16, wherein determining the number of fringes includes counting the number of fringes.

18. The method of claim 16, wherein determining the pulse duration includes estimating the pulse duration to be N×t/B, where N is the number of fringes within the full width half maximum of the correlation function, t is the duration between adjacent fringes, and B is a deconvolution factor that depends on the shape of the child pulses.

19. The method of claim 14, wherein directing the electromagnetic pulses through the guidance system includes directing the pulses through a microscope objective of the guidance system.

20. The method of claim 14, wherein the fluorescence signal generated by the fluorescence producing device passes through at least a microscope objective of the guidance system.

21. The method of claim 14, wherein the electromagnetic source is an optical source and the electromagnetic pulses are optical pulses.

22. The method of claim 14, wherein the pulse duration is the full width half maximum of the electromagnetic pulses.

23. A method of generating a signal communicating a measurement of a pulse duration of an electromagnetic source, the method comprising:
   directing electromagnetic pulses that are delayed relative to each other by a varying time delay to a fluorescence producing device including a suspension of immobilized quantum dots after the electromagnetic pulses have traveled through a guidance system;
   receiving a fluorescence signal generated by the immobilized quantum dots while the electromagnetic pulses are incident upon the immobilized quantum dots; and
   determining the pulse duration of the electromagnetic pulses that are incident upon the immobilized quantum dots by analyzing the fluorescence signal relative to the relative time delay between the electromagnetic pulses.

24. An apparatus comprising:
   an immobilized suspension of quantum dots placed in a path of electromagnetic pulses that are delayed relative to each other by a varying time delay;
   a detector that receives fluorescence produced at the suspension while the electromagnetic pulses impinge upon the suspension; and
   a data system that receives a value related to the time delay and an output of the detector and determines the pulse duration of the electromagnetic pulses based on the value of the time delay and the output of the detector.

25. A system for converting an imaging apparatus that images a sample attached to a substrate into a pulse duration measurement apparatus, the system comprising:
   a delay producing system that receives a parent electromagnetic pulse from a light source configured to image the sample to be imaged and that outputs two spatially-overlapped child electromagnetic pulses having a relative and adjustable time delay between each other;
   a fluorescence producing device including:
      a substrate, and
      a test sample that includes a fluorescent material that is distinct from the sample to be imaged that is placed on the substrate;
   a detector that receives fluorescence produced at the fluorescence producing device while the child electromagnetic pulses are incident upon the fluorescence producing device; and
   a data system that receives a value relating to the time delay and an output of the detector and determines the pulse duration of the electromagnetic pulses that are incident upon the sample to be imaged based on the value of the time delay and the output of the detector.

26. The system of claim 25, wherein the test sample replaces the sample to be imaged during the pulse duration measurement.

27. The system of claim 25, wherein the substrate is a microscope coverslip that is configured to receive the sample to be imaged.

28. The system of claim 25, further comprising:
   a guidance system between the delay producing system and the fluorescence producing device such that the child pulses travel through the guidance system on the way to the fluorescence producing device; and
   a control unit coupled to the guidance system for adjusting one or more parameters of components of the guidance system in response to the determined electromagnetic pulse duration.

* * * * *